United States Patent [19]

Fukami et al.

[11] Patent Number: 4,862,297

[45] Date of Patent: Aug. 29, 1989

[54] APPARATUS FOR REPRODUCING A DIGITAL SIGNAL WITHOUT EMPLOYING TRACKING SIGNALS

[75] Inventors: Tadashi Fukami; Hiroyuki Ino, both of Kanagawa, Japan

[73] Assignee: Sony Corporation, Tokyo, Japan

[21] Appl. No.: 152,821

[22] Filed: Feb. 5, 1988

[30] Foreign Application Priority Data

Feb. 6, 1987 [JP] Japan ............................ 62-025774
Feb. 6, 1987 [JP] Japan ............................ 62-025771
Feb. 21, 1987 [JP] Japan ............................ 62-038972

[51] Int. Cl.$^4$ .................................... G11B 5/008
[52] U.S. Cl. ............................. 360/53; 360/32; 360/64
[58] Field of Search ............ 360/32, 53, 64, 38.1, 360/72.2; 358/336

[56] References Cited

U.S. PATENT DOCUMENTS 4,398,224 8/1983 Watanabe ..................... 360/36.2
4,742,519 5/1988 Abe et al. ..................... 360/38.1

FOREIGN PATENT DOCUMENTS 57-200917 12/1982 Japan ............................ 360/53
56-149273 3/1983 Japan ............................ 360/53

Primary Examiner—Vincent P. Canney
Assistant Examiner—Kevin J. Fournier
Attorney, Agent, or Firm—Hill, Van Santen, Steadman & Simpson

[57] ABSTRACT

A reproducing apparatus for reproducing blocks from a recording medium on which a plurality of signal blocks are recorded on plural recording tracks, uses a rotary head which is rotated at a speed equal to at least twice the normal speed. Error detection of a reproduced signal is performed for each signal block, and a detection signal and a reproduced signal of the corresponding signal block are written into a memory. If the detection signal indicates that no error is detected, the reproduced signal from the corresponding signal block is prevented from being written again into the memory. A reproduced track address signal and a reference track address signal are compared, and in accordance with the comparison result, translation of the recording medium is controlled.

7 Claims, 17 Drawing Sheets

| W1 (PCM-ID) | | | W2 (BLK ADRS) | | | | | | | |
|---|---|---|---|---|---|---|---|---|---|---|
| ID 1 | ID 2 | FR ADRS | 0 | X | X | X | X | 0 | 0 | 0 |
| OPTL CODE | | | 0 | X | X | X | X | 0 | 0 | 1 |
| ID 3 | ID 4 | FR ADRS | 0 | X | X | X | X | 0 | 1 | 0 |
| OPTL CODE | | | 0 | X | X | X | X | 0 | 1 | 1 |
| ID 5 | ID 6 | FR ADRS | 0 | X | X | X | X | 1 | 0 | 0 |
| OPTL CODE | | | 0 | X | X | X | X | 1 | 0 | 1 |
| ID 7 | ID 8 | FR ADRS | 0 | X | X | X | X | 1 | 1 | 0 |
| OPTL CODE | | | 0 | X | X | X | X | 1 | 1 | 1 |

2A1  2B1  2A2  2B2

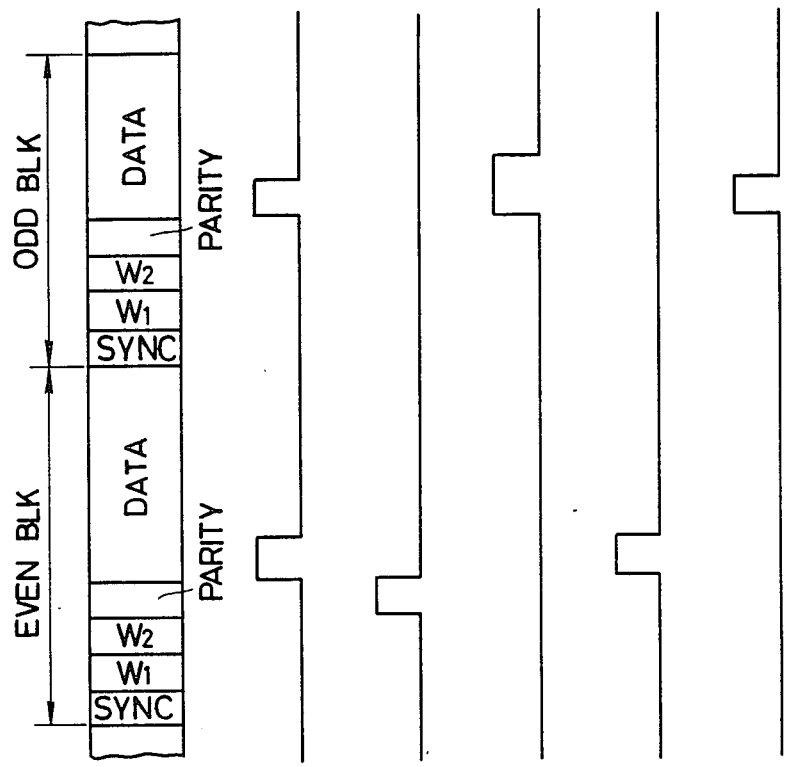

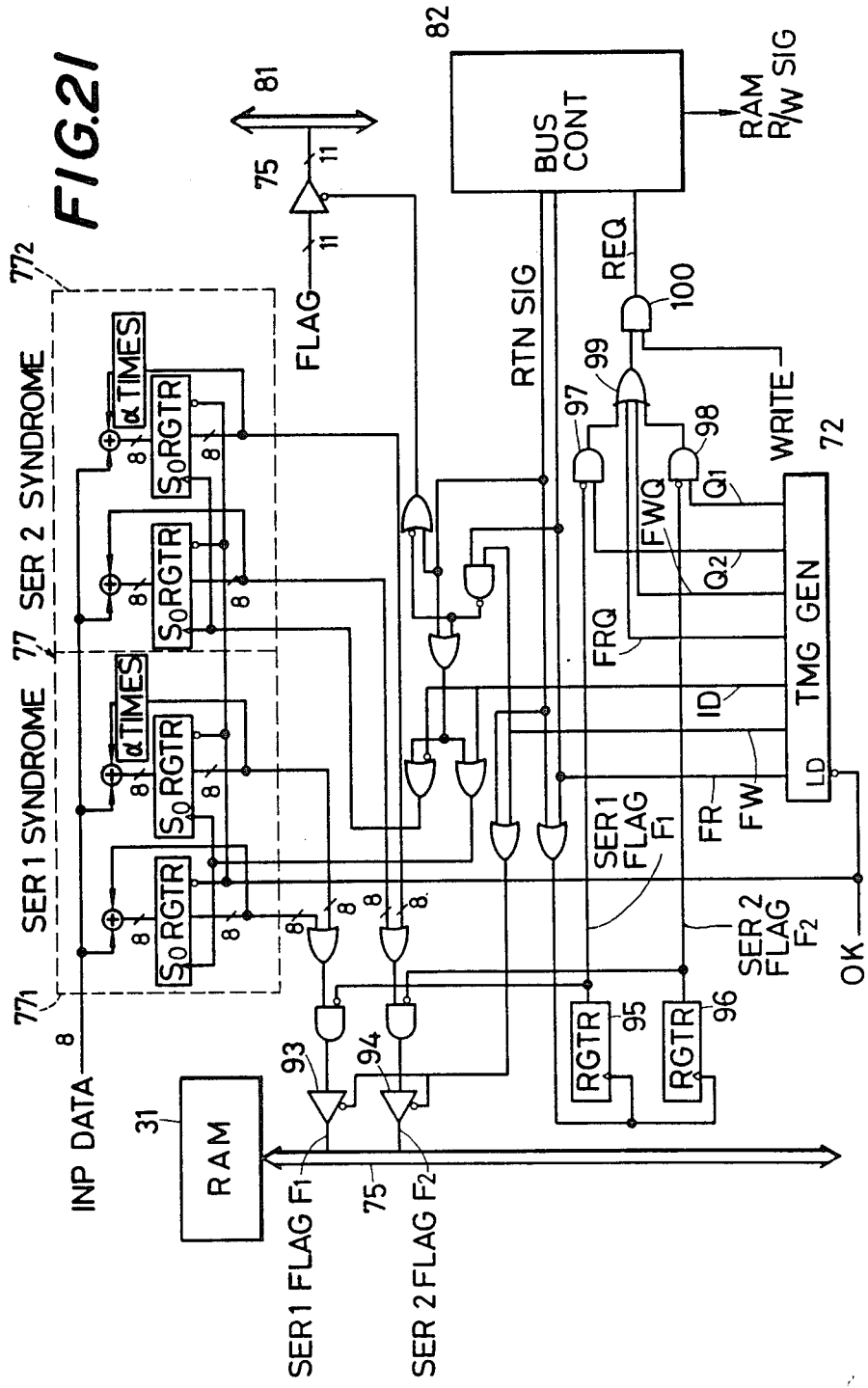

APPARATUS FOR REPRODUCING A DIGITAL SIGNAL WITHOUT EMPLOYING TRACKING SIGNALS

BACKGROUND OF THE INVENTION

1. Field of the Invention

The present invention relates to an apparatus for reproducing a digital signal and, more particularly, to an apparatus for reproducing a digital signal which is free from tracking controls.

2. Description of the Prior Art

A digital audio tape recorder using a rotary head (a so-called a DAT or R-DAT) has been developed as an apparatus for recording/reproducing a digital signal. In a normal digital audio tape recorder, an ATF (Automatic Tracking Finding) signal for tracking control is recorded on a tape. In a reproducing mode, the ATF signal is reproduced to control tape travel, i.e., tracking control.

Another conventional apparatus has been proposed in which a digital signal recorded on a tape is reproduced without using the ATF signal (e.g., U.S. patent application No. 87,093 filed on Aug. 19, 1987). Still another conventional apparatus has been proposed wherein tape ravel is controlled based on the method described in Japanese Patent Application No. 62-17970, filed on January 1987.

In the digital signal reproducing apparatus, a rotary head is rotated at a rotational speed twice that of the speed used during the recording mode, and a track address signal and block address signal are detected from the reproduced digital signal. Thus, based on these address signals, reproduced digital data in each block is rewritten into a memory. The digital data written into the memory are read out in a predetermined order, thereby recovering the recorded digital data in an original order.

In order to realize the digital signal reproducing apparatus, the digital data reproduced by the rotary head must be accurately written into the memory. In the digital signal reproducing apparatus using a tape, such as the DAT, tape travel must be controlled.

SUMMARY OF THE INVENTION

It is an object of the present invention to provide an improved apparatus for reproducing a digital signal.

It is another object of the present invention to provide an improved apparatus for reproducing a digital signal which does not utilize a recorded tracking signal.

It is still another object of the present invention to provide an improved apparatus for reproducing a digital signal wherein a digital signal reproduced by a rotary head rotated at a rotational speed twice that used in a recording mode is accurately written in a memory.

It is still another object of the present invention to provide an improved apparatus for reproducing a digital signal wherein tape travel can be accurately controlled without utilizing a recorded tracking signal.

According to the present invention, there is provided a digital signal reproducing apparatus wherein a recording medium on which a plurality of signal blocks are presented in a plurality of recording tracks is reproduced using a rotary head, and the rotary head is rotated at a speed at least twice normal speed, comprising: error detection means for performing error detection of a reproduced signal for each predetermined signal block;

memory means in which a detection signal from the error detection means and the reproduced signal from the signal block corresponding to the detection signal are written; and means for checking the content of the detection signal written into the memory means and, when the detection signal represents no error, preventing the reproduced signal of a signal block corresponding to the detection signal from being again written in the memory means.

BRIEF DESCRIPTION OF THE DRAWINGS

FIGS. 16A to 16F are timing charts of the circuit shown in FIG. 15;

FIG. 21 is a circuit diagram of a syndrome arithmetic circuit.

DETAILED DESCRIPTION OF THE DRAWINGS

A rotary head type digital audio tape recorder (a socalled an R-DAT) has been developed using rotary head type recording/reproducing apparatus.

The tape format and data format of the R-DAT type tape recorder will be described with reference to the drawings.

Figure 1:
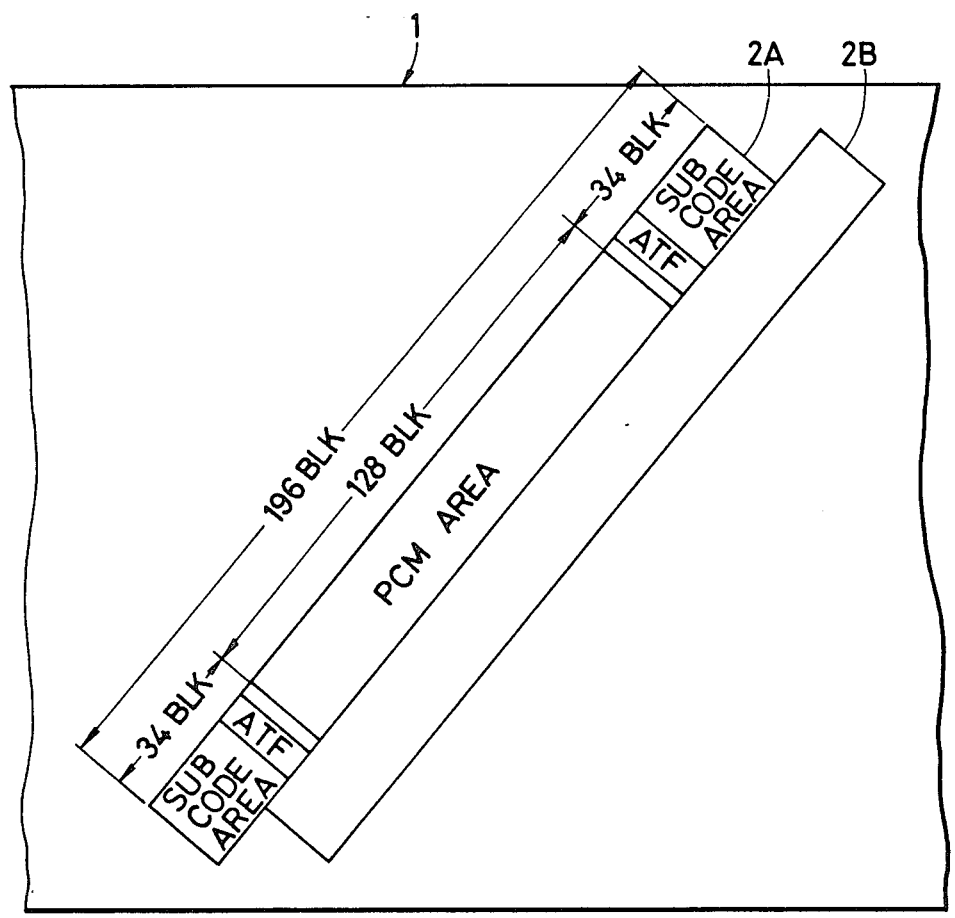
FIG. 1 shows a tape format of a DAT.

FIG. 1 shows the tape format. A track 2A recorded by a first rotary magnetic head A (to be referred to simply as "head A" hereinafter) and a track 2B recorded by a second rotary magnetic head B (to be referred to simply as "head B" hereinafter) are alternately formed on a magnetic tape 1 so as to be inclined with respect to the longitudinal direction of the tape 1. Note that the heads A and B, having different asimuth angles, are provided adjacent a drum at an angular interval of about 180°. During one revolution of a drum with the heads A and B, the tracks 2A and 2B are formed for each ½ revolution.

One track 2A (2B) is called one segment, and is divided into 196 data blocks. 34 blocks at each end portion serve as a sub-code area, and 128 central blocks sserve as a PCM area. Each sub-code area is further divided into several sections, and a predetermined signal, e.g., a sub code, PLL run-in signal, or the like is recorded in each section. An ATF signal serving as a pilot signal for tracking servo is recorded in one section.

A PCM audio signal is recorded in the PCM area together with other predetermined data. The PCM area consists of 128 data blocks, and each block is constituted as shown in FIG. 2.

Figures 2, 3:
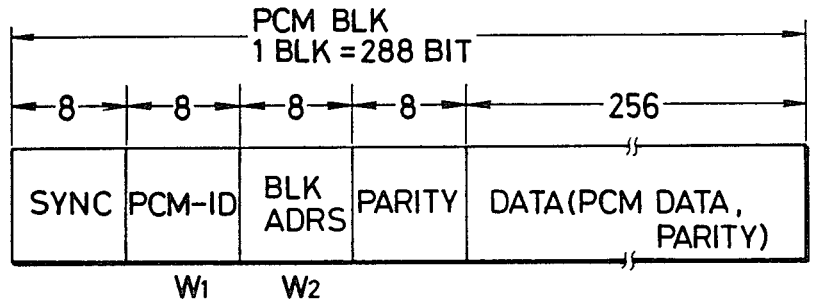
FIG. 2 shows a PCM block format of the DAT.
FIG. 3 shows a format of words $W_1$ and $W_2$ in a PCM block of the DAT.

In FIG. 2, each block consists of 288 bits, and an 8-bit (1-symbol or byte) block sync signal is stored in the initial portion and then 8-bit PCM-ID data is stored. Next to the PCM-ID data, block address data is stored. For 2 symbols ($W_1$ and $W_2$) of the PCM-ID and the block address data, simple parity error detection coding is performed, and 8-bit parity data is stored next to the block address data. The block address data consists of 7 bits excluding the most significant bit (MSB), as shown in FIG. 3. The MSB is set to be "0", thus indicating the PCM block. The 7-bit block address data is sequentially changed from (00) to (7F) (hexadecimal notation), i.e., "0" to "127". The PCM-ID data recorded in EVEN blocks whose lower 3 bits of the block address data are (000), (010), (100), and (110) are predetermined. An optional code can be recorded in ODD blocks whose lower 3 bits of the block address data are (001), (011), (101), and (111).

The PCM-ID data includes 2-bit ID1 to ID8 and a 4-bit frame address. In each of ID1 to ID7, identification information is defined. The identification information includes an identification of audio use or other use, program start, ON/OFF of preemphasis, preemphasis characteristics, a sampling frequency, and the like.

The frame address consists of 4 bits. Identical frame addresses are provided to the tracks 2A and 2B. More specifically, the tracks 2A and 2B which are formed by one revolution of a drum with the heads A and B have the same frame addresses. The frame addresses are sequentially and repetitively records as "0" to "F" in every frame in the PCM-ID section ($W_1$) of the EVEN block address.

PCM data consists of 32 symbols, and can be subjected to error detection and error correction using $C_1$ and $C_2$ codes. In this case, the $C_1$ series can perform error detection and error correction in two blocks, e.g., a pair of the EVEN and ODD blocks.

In the normal digital audio tape recorder having the above-mentioned tape and data formats, control of the tracking servo is performed on the basis of the ATF signal. That is, a tracking error is detected based on the ATF signals included in the reproduced signals obtained from the heads A and B, and the speed of a capstan motor, i.e., the tape speed, is controlled based on the error signal, thereby performing tracking.

In this manner, a method of performing tracking servo using the ATF signal requires high mounting precision such as a precise mounting height and angle of the heads A and B with respect of the drum, and in this method, a drum motor and a capstan motor cannot be united, resulting in high cost.

In order to eliminate the above drawbacks, the present invention uses a no-tracking method, without using the above ATF signal. A tape-speed control method in the no-tracking method is a method of utilizing the frame address obtained from a reproduced signal. The reproduced frame address is compared with a reference frame address to control the tape speed.

Figure 4:
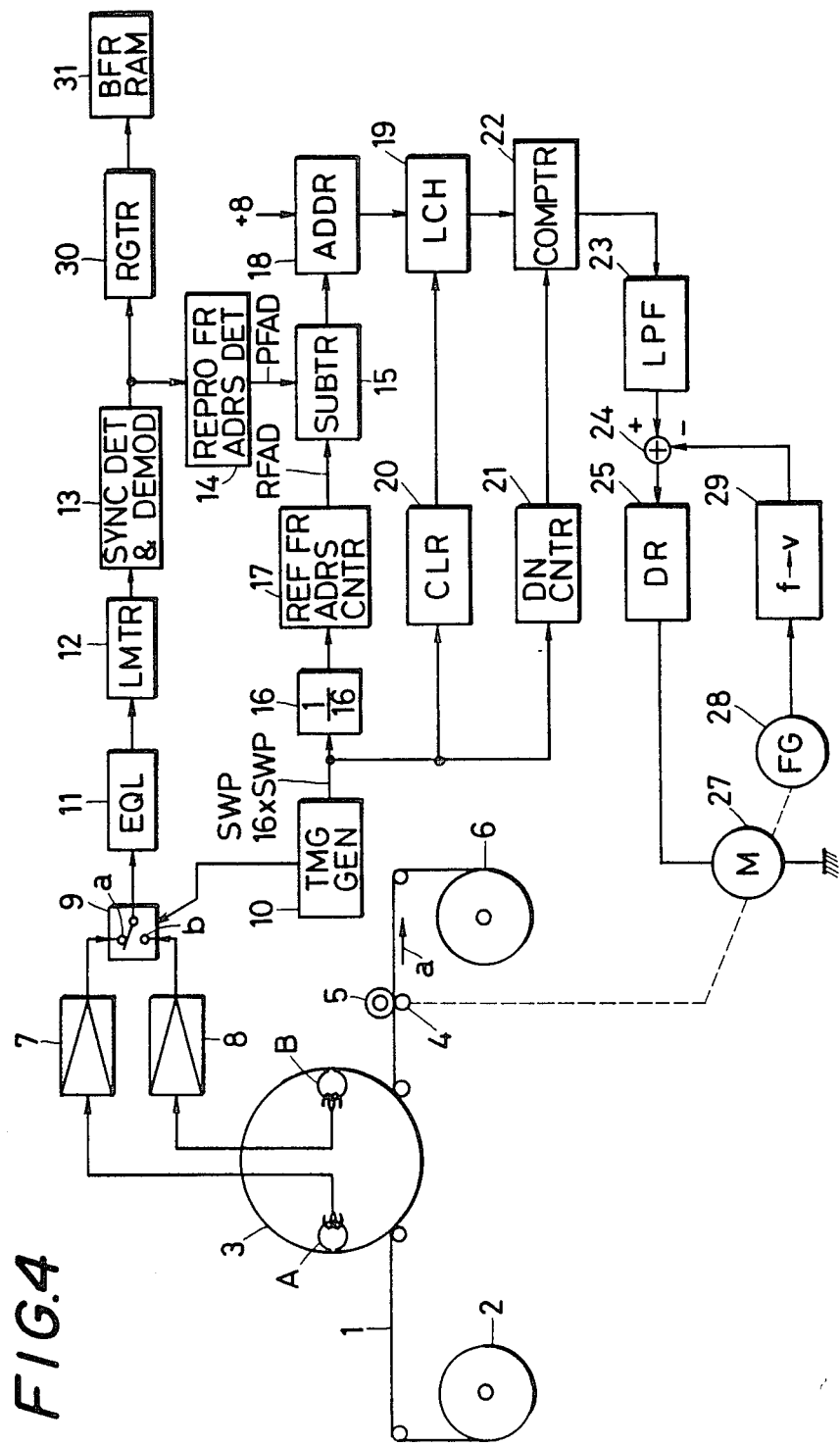
FIG. 4 is a block diagram of a digital signal reproducing apparatus according to the present invention.

FIG. 4 shows a servo circuit of a DAT using the notracking method, and FIGS. 5A to 5H are timing charts illustrating the operation thereof.

Referring to FIG. 4, a tape 1 fed from a supply reel 2 is wound around the peripheral surface of a drum 3 in an angular range of about 270°, and then travels in a direction indicated by an arrow a by a capstan 4 and a pinch roller 5. The tape 1 is then taken up by a takeup reel 6. Heads A and B having different asimuth angles are provided to the drum 3 at an angular interval of about 180°.

Figure 5:
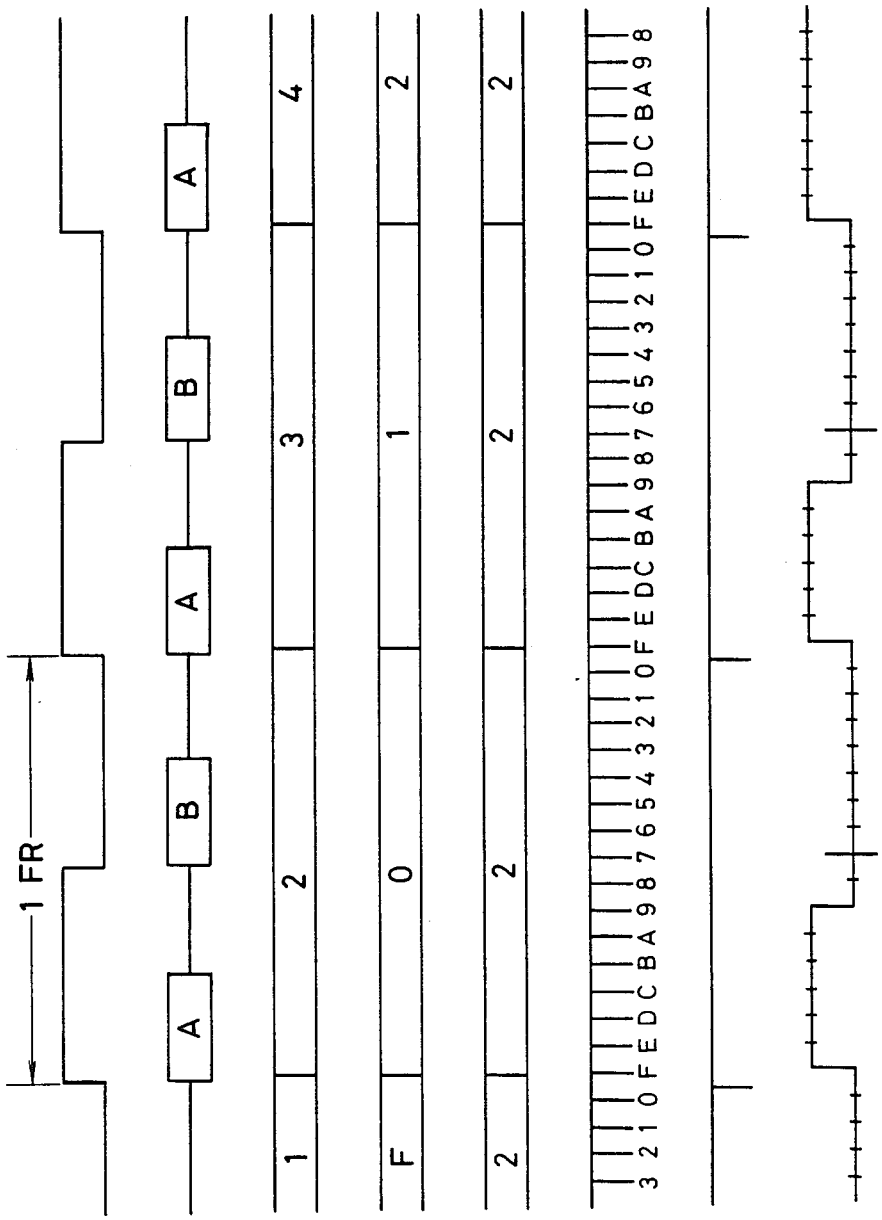
FIGS. 5A to 5H are timing charts of the digital signal reproducing apparatus shown in FIG. 4.

In a reproducing mode, the heads A and B are rotated at a speed at least twice (4,000 rpm) that in a recording mode (2,000 rpm). Reproduced signals alternately obtained from the heads A and B are applied to contacts a and b of a switch 9 through reproducing amplifiers 7 and 8. The contacts a and b of the switch 9 are switched in response to a switching pulse SWP, shown in FIG. 5A, generated by a timing generator 10. A reproduced waveform shown in FIG. 5B is obtained from the switch 9. Reference symbols A and B in this reproduced waveform respectively indicate envelopes of reproduced signals (RF signals) from the heads A and B. The reproduced signal having the reproduced waveform is supplied to a sync signal detector and demodulator 13 through an equalizer 11 and a limiter 12. The reproduced signal, consisting of 10 bits for each symbol, is demodulated to a signal consisting of 8 bits for each symbol based on the detection of the sync signal. In a recording mode, the signal consisting of 8 bits as one symbol is converted to a preferable 10-bit pattern digital modulation in order to reduce a low-frequency component as small as possible. Thus, this signal must be demodulated to an original signal consisting of 8 bits as one symbol. The demodulated signal is supplied to a buffer RAM 31 of a reproduced signal processor, and is also supplied to a reproduced frame address detector 14, thus extracting reproduced frame addresses PFAD, as shown in FIG. 5C. The reproduced frame addresses PFAD are sequentially obtained at intervals depending on the tape speed, and are supplied to a subtractor 15.

Pulses at a repetition rate of 16×SWP are obtained from the timing generator 10. The pulses 16×SWP are frequency-divided by a 1/16 frequency divider 16, and are then counted by a reference frame address counter 17. The count values from the counter 17 are supplied to the subtracter 15 as the reference frame addresses RFAD are substracted from the reproduced frame addresses PFAD, thus obtaining differences shown in FIG. 5E.

Therefore, the differences reflect the tape speed. In this embodiment, the PWM (pulse-width modulation) is performed in accordance with the differences, thereby forming a tape speed control signal.

A value "+8" is added to each difference by an adder 18, and the sum is latched by a latch 19. Every 16 pulses of the signal 16×SWP are counted by a clear circuit 20 comprising a counter, and latch pulses shown in FIG. 5G are generated. In response to the latch pulses, the sum is latched in latch unit 19. The pulses 16×SWP are counted down by a counter 21, and the count value from the counter 21 is compared with the latched sum by a comparator 22. In this manner, a control pulse whose duty ratio is changed in accordance with the difference, as shown in FIG. 5H, can be obtained from the comparator 22.

In FIGS. 5A to 5H, since reproduced frame addresses PFAD are "2", "3", "4", ... with respect to the reference frame addresses RFAD "0", "1", "2", ..., the difference is "2". Therefore, in this case, the tape speed must be decreased. For this purpose, "+8" is added to the difference, and the duty ratio (50%) of the control pulse at the normal speed is modified to decrease the tape speed.

The control pulse passes through a low-pass filter 23 to be converted to a speed control signal. The speed control signal controls the rotational speed of a capstan motor 27 for driving the capstan 4, through an adder 24 and a driver 25. The motor 27 is independently provided with a normal speed servo loop, such that a rotational speed of the motor 27 is detected by a speed detector 28 such as a FG (frequency generator). The detection signal is converted into a voltage by a frequency-voltage converter 29, and the voltage is substracted from the speed control signal in the adder 24.

With the no-tracking method described above, a tracking servo circuit using a conventional ATF signal can be omitted. The heads A and B need not have particularly high mounting precision. Furthermore, one motor can be used as both the capstan motor 27 and the drum motor.

The above-mentioned no-tracking method effectively utilizes frame addresses recorded on a tape. However, a detection method of reproduced frame addresses PFAD poses the following problems.

Figure 6:
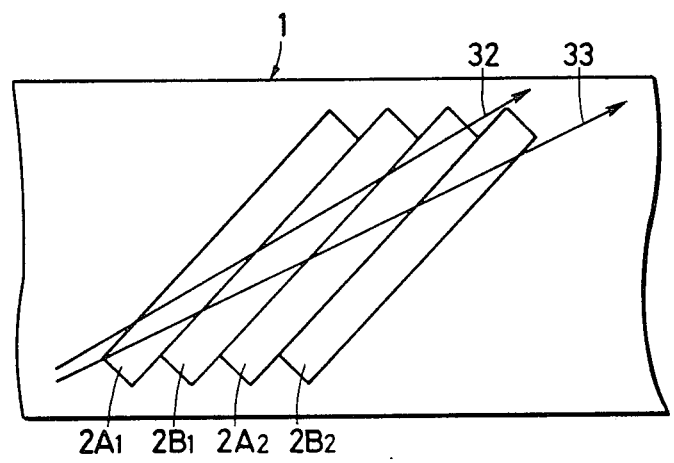
FIG. 6 shows scanning paths by rotary heads A and B in the digital signal reproducing apparatus of the present invention.
Figure 7:
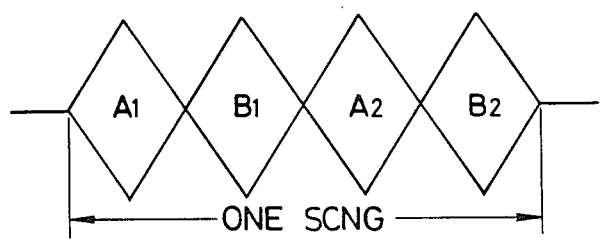
FIG. 7 is a waveform chart of a signal reproduced by the rotary heads in the digital signal reproducing apparatus of the present invention.

In the no-tracking method, the heads A and B are rotated as a speed twice or more than in the recording mode, and the scanning paths of the heads A and B do not always scan two adjacent tracks 2A and 2B, as indicated by arrows 32 and 33 in FIG. 6 but may scan across two or more tracks during a single scanning operation. For example, when the heads A and B obliquely cross four tracks $2A_1$, $2B_1$, $2A_2$ and $2B_2$ during a single scanning operation, as indicated by an arrow 33, substantially rhombic waveforms $A_1$, $B_1$, $A_2$ and $B_2$ reproduced from the corresponding tracks $2A_1$ and $2B_2$ appear, as shown in FIG. 7. In this case, reproduced frame addresses extracted from the reproduced waveforms $A_1$ to $B_2$ have values different from the correct values. Therefore, the reproduced frame addresses PFAD to be compared with the reference frame addresses RFAD in the subtracter 15 in FIG. 4 cannot be determined, and thus control is made impossible.

In order to solve the above problem, one of the different reproduced frame addresses may be extracted with reference to a pulse obtained from a pulse generator connected to the motor 27. However, in this method, since the speed of the motor varies, it is very difficult to time the operations.

Figure 8:
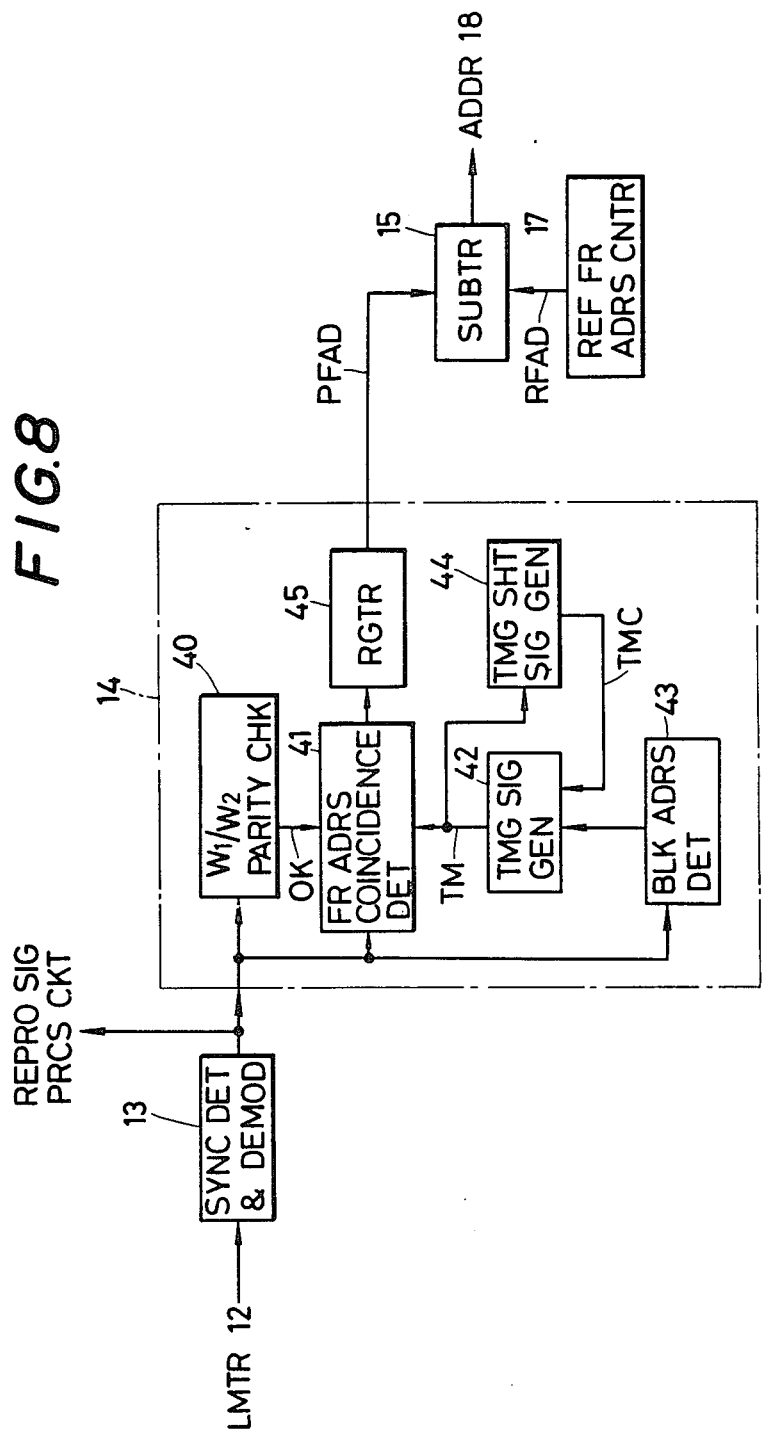
FIG. 8 is a block diagram showing an embodiment of a detector for a frame address signal.

FIG. 8 shows an embodiment of a reproduced frame address detector 14 in the DAT employing the no-tracking method shown in FIG. 4, and portions corresponding to those in FIG. 4 are denoted by the same reference numerals and a detailed description thereof will be omitted.

Referring to FIG. 8, the reproduced frame address detector 14 comprises a $W_1/W_2$ parity check circuit 40, a frame address coincidence detector 41, a timing signal generator 42, a block address detector 43, a timing shift signal generator 44, and a register 45.

The $W_1/W_2$ parity check circuit 40 performs CRC (parity) check satisfying $P=W_1+W_2$ for $W_1$ and $W_2$ of data of the reproduced signals obtained by the demodulator 13. If a correct check result is obtained, the circuit 40 sends a signal OK to the frame address coincidence detector 41. The block address detector 43 detects block addresses from the reproduced signals, and sends the detected addresses to the timing signal generator 42. The timing signal generator 42 generates a timing signal TM having a pulse width corresponding to a range of "60" to "6F" as substantially the central portion of a predetermined range, e.g., "0" to "127" of the detected block addresses, and supplies the signal TM to the frame address coincidence detector 41.

When the parity check described above is successively recognized as correct twice, the detector 41 detects the frame addresses included in the pulse width of the timing signal TM in accordance with the reproduced signals. Assume that the heads A and B scan four tracks $2A_1$ to $2B_2$ during a single scanning operation and the reproduced waveforms $A_1$ to $B_2$ shown in FIG. 7 are obtained. In this case, the block addresses included in the reproduced waveforms $A_1$ to $B_2$ are different from each other. Assume that the waveform including the block addresses included with the range of "60" to "6F" corresponds to $A_2$; the frame addresses of the track $2A_2$ from which the waveform $A_2$ is obtained are extracted and supplied to the register 45. The extracted frame addresses are supplied, as the reproduced frame addresses PFAD, from the register 45 to the subtracter 15, and the reference frame addresses RFAD are subtracted therefrom.

If a drop-out of a signal is present at a portion of the tracks $2A_1$ to $2B_2$ corresponding to the range of "60" to "6F" of the timing signal TM, the timing signal TM cannot be generated, and extraction of the reproduced frame addresses PFAD is not allowed. The timing shift signal generator 44 detects that a predetermined number of timing signals TM are not generated for the timing signal TM or are not kept generated for a predetermined period of time, and sends a timing shift signal TMC to the timing signal generator 42. With this signal, the timing signal generator 42 generates a timing signal having a pulse width corresponding a range different from "60" to "6F", e.g., "70" to "7F". The reproduced frame addresses PFAD can thus be extracted from the reproduced waveform having the block addresses "70" to "7F" of the reproduced waveforms $A_1$ to $B_2$ of the tracks $2A_1$ to $2B_2$.

Figure 9:
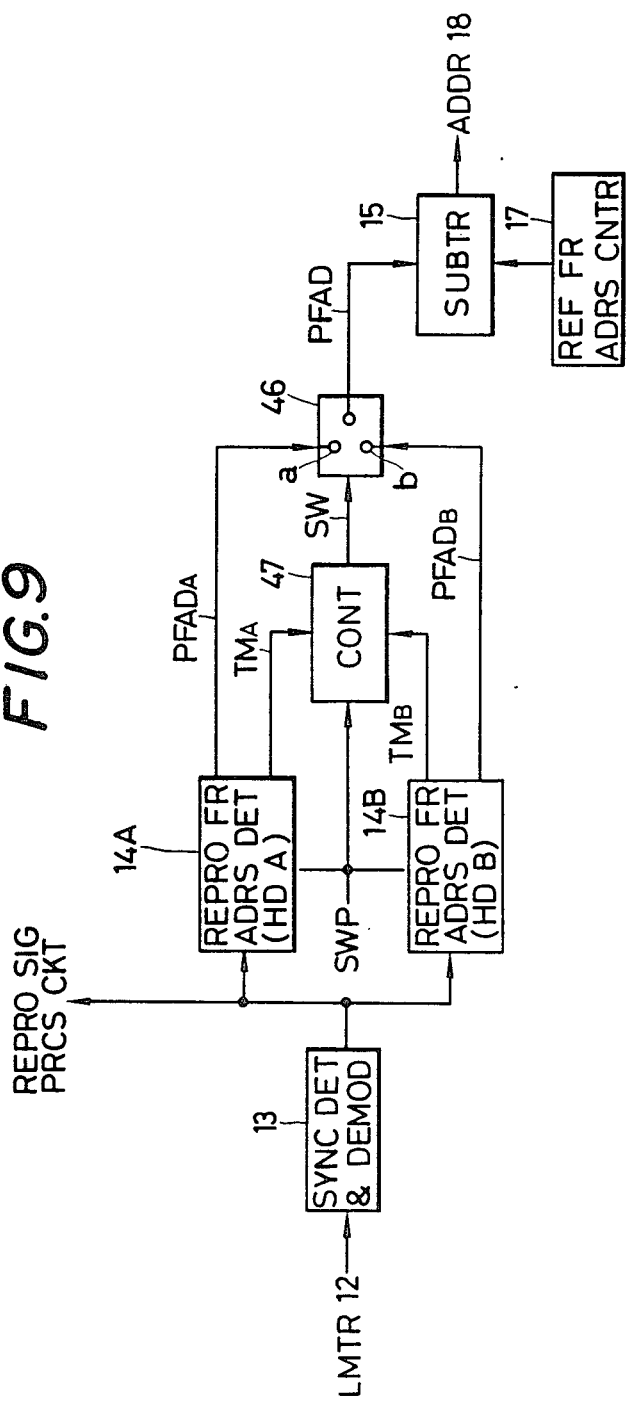
FIG. 9 is a block diagram showing another embodiment of a detector for the frame address signal.

FIG. 9 shows another embodiment of the reproduced frame address detector 14, and blocks corresponding to those in FIGS. 4 and 8 are denoted by the same reference numberals.

This embodiment can solve the following problems caused by a mounting error of the heads A and B.

Figure 10:
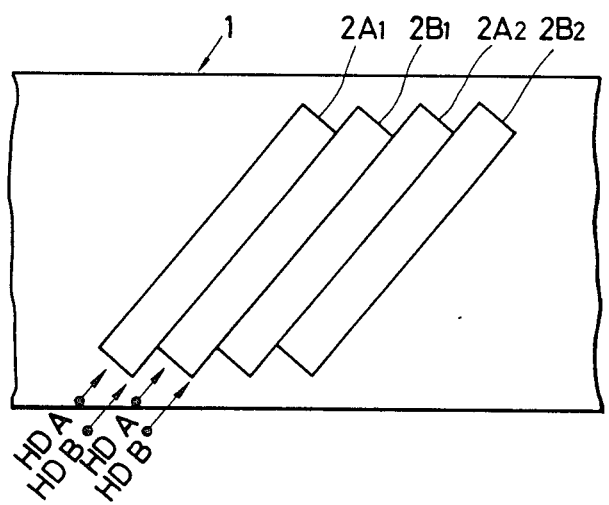
FIG. 10 shows scanning paths of the rotary heads A and B.

When the heads A and B are mounted to have a step along the axis of the drum 3 due to their mounting errors, the scanning start points of the heads A and B are deviated as shown in FIG. 10. The reproduced frame addresses obtained from the reproduced waveforms $A_1$ to $B_2$ shown in FIG. 7 have no continuity, and can no longer reflect the tape speed.

In this embodiment, as shown in FIG. 9, a reproduced frame address detector $15_A$ for the head A, for extracting reproduced frame addresses $PFAD_A$ from the reproduced waveform of the head A, and a reproduced frame address detector $14_B$ for the head B, for extracting reproduced frame addresses $PFAD_B$ from the reproduced waveform of the head B are arranged. The detectors $14_A$ and $14_B$ are alternately operated in accordance with the rotation of the drum with the heads A and B, in response to the switching pulse SWP. The reproduced frame addresses $PFAD_A$ and $PFAD_B$, obtained from the detectors $14_A$ and $14_B$, are respectively supplied to contacts a and b of a switch 46. The switch 46 is switched in response to a switching signal SW from a controller 47 so as to select the reproduced frame addresses $PFAD_A$ or $PFAD_B$. The selected addresses are supplied to the subtracter 15 as the reproduced frame addresses PFAD. The controller 47 forms the switching signal SW based on timing signals $TM_A$ and $TM_B$ respectively obtained from the detectors $14_A$ and $14_B$ and the switching pulse SWP.

In a normal state, the switch 46 is closed to the contact a side, so that the reproduced frame addresses $PFAD_A$ are selected to have a priority over the addresses $PFAD_B$. When the reproduced frame addresses $PFAD_A$ are not extracted due to drop-out, the switch 46 is switched to the contact b side, and the reproduced frame addresses $PFAD_B$ are selected.

Figure 11:
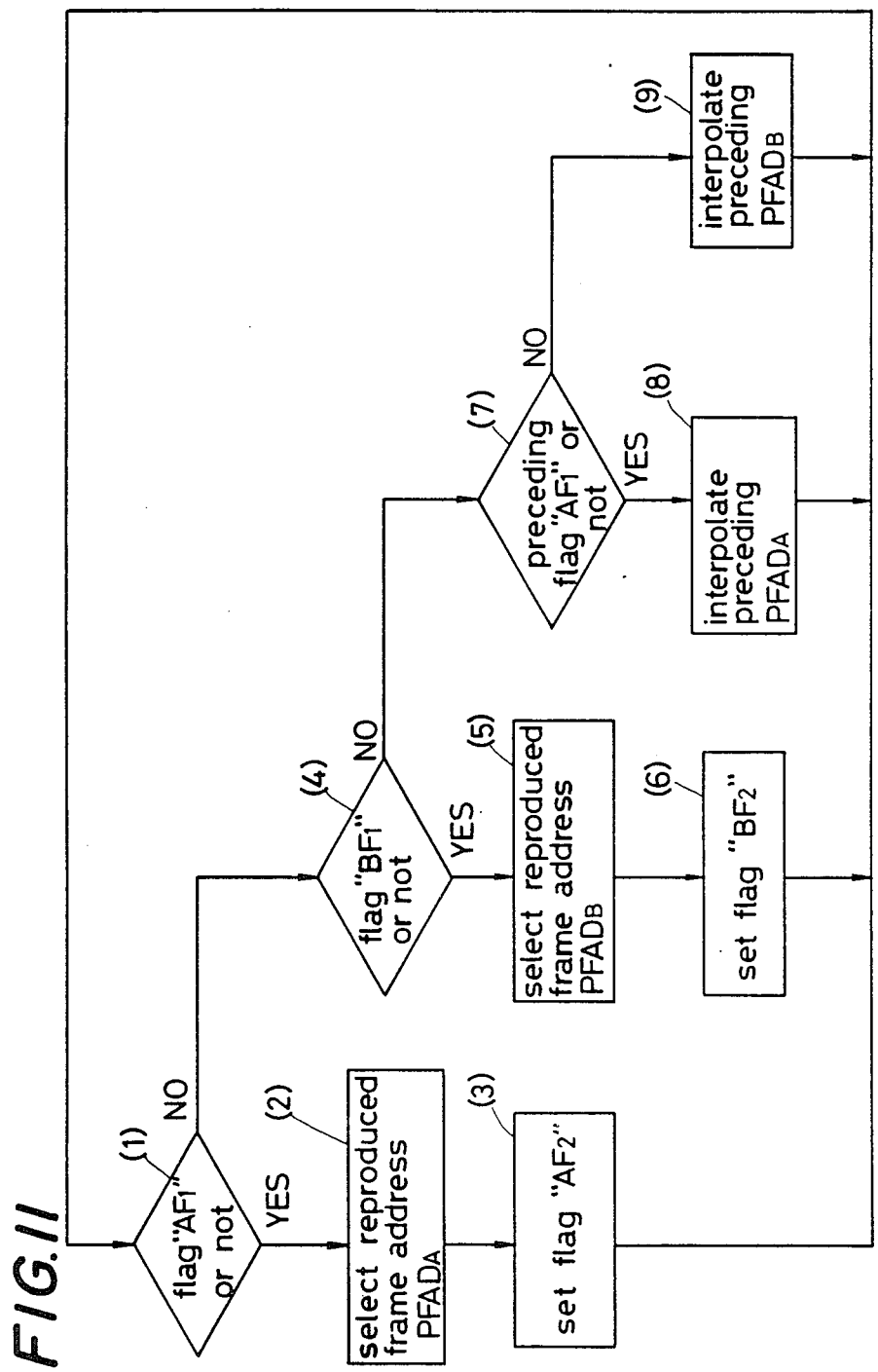
FIG. 11 is a flow chart for detecting a reproduced frame address.

FIG. 11 is a flow chart of the units of the controller 47 for performing the above-mentioned operation.

Referring to FIG. 11, it is checked in unit or step (1) if flag "$AF_1$" indicating that the reproduced frame addresses $PFAD_A$ are extracted is set. If YES in step (1), the flow advances to step (2) to select the addresses $PFAD_A$. In step (3), a flag "$AD_2$" indicating that the addresses $PFAD_A$ have been selected is set. Thereafter, the flow returns to step (1).

However, if NO in step (1), the flow advances to step (4), and it is checked if a flag "$BF_1$ indicating that the reproduced frame addresses $PFAD_B$ are extracted is set. If YES in step (4), the flow advances to step (5) to select the addresses $PFAD_B$. In step (6), a flag "$BF_2$" indicating that the addresses $PFAD_B$ have been selected to set, and the flow then returns to step (1).

If NO in steps (1) and (4), the flow advances to step (7), and it is checked if the flag which was set immediately before extraction of both the addresses $PFAD_A$ and $PFAD_B$ is disabled is "$AF_1$". If YES in step (7), the flow advances to step (8), and the addresses $PFAD_A$ are obtained by interpolating the preceding addresses $PFAD_A$, and are selected. Thereafter, the flow returns to step (1).

If NO in step (7), the flow advances to step (9) to obtain the $PFAD_B$ by interplating the preceding addresses $PFAD_B$ and to select them. Thereafter, the flow returns to step (1). Not that interpolation performed in steps (8) and (9) employs conventional data interpolation such as preceding value interpolation.

As described above, channels for the heads A and B are independently formed, speed control is performed with reference to only the reproduced frame addresses $PFAD_A$ or $PFAD_B$ obtained from one channel, and information from the other channel is discarded. When the reproduced frame addresses of both the channels cannot be detected, the reproduced frame addresses of the preceding channel are interpolated. Thus, the reproduced frame addresses PFAD which reflect a tape speed can always be obtained.

An embodiment of the frame address coincidence detector 41 and the timing shift signal generator 44 and each of the reproduced frame address detectors 14, $14_A$ and $4_B$ shown in FIGS. 8 and 9 will be described with reference to FIGS. 12 and 13. In this case, portions corresponding to those in FIGS. 8 and 9 are denoted by the same reference numberals.

Figure 12:
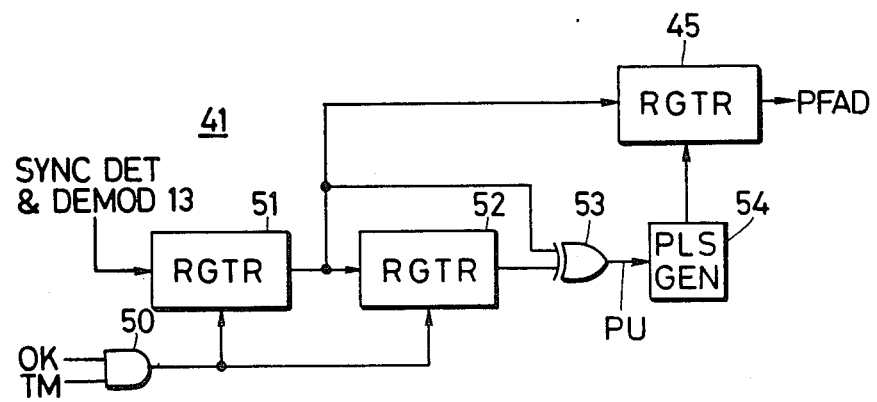
FIG. 12 is a block diagram showing still another embodiment of a detector for the frame address.

FIG. 12 shows an embodiment of the frame address coincidence detector 41.

Referring to FIG. 12, when the correct parity check result is obtained, the signal OK and the timing signal TM are supplied to an AND gate 50, and the output from the AND gate 50 is supplied to registers 51 and 52 as a write signal. The register 51 receives the reproduced signal from the demodulator 13, and the reproduced frame addresses PFAD are extracted from the reproduced signal in accordance with the write signal. The extracted addresses are stored in the register 51, and are then transferred to the register 52. The reproduced frame addresses are then supplied to an EX (exclusive)-OR gate 53 and the register 45.

The EX-OR gate 53 detects if the currently and previously extracted reproduced frame addresses coincide with each other. If a coincidence is established between them, the EX-OR gate 53 sends a coincidence signal PU to a pulse generator 54. Based on this signal, the pulse generator 54 sends a write pulse to the register 45, so that the register 45 stores the reproduced frame addresses from the register 51 and outputs them as the addresses PFAD ($PFAD_A$ or $PFAD_B$).

Figure 13:
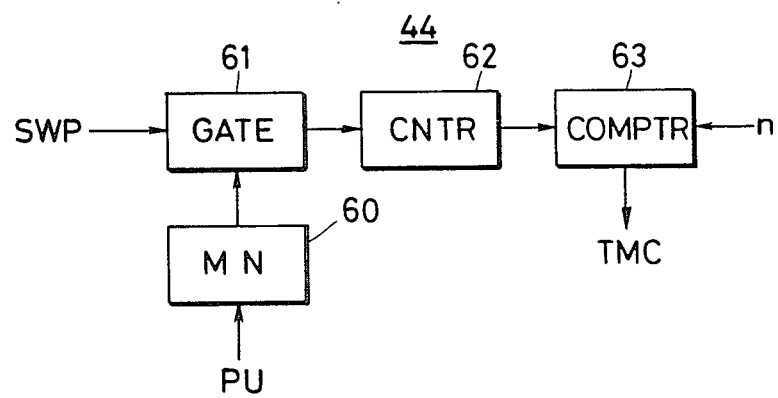
FIG. 13 is a block diagram showing an embodiment of a timing shift signal generator.

FIG. 13 shows an embodiment of the timing shift signal generator 44.

In FIG. 13, a monostable multivibrator 60 is triggered by the coincidence signal PU, and the output from the monostable multivibrator 60 is supplied to a gate circuit 61 as a gate pulse. The gate circuit 61 also receives the switching pulses SWP, and allows the switching pulses SWP corresponding to the pulse width of the gate pulse to pass therethrough. The number of passed switching pulses SWP depends on the period in which the output from the register 51 shown in FIG. 12 does not coincide with the output from the register 52. The switching pulses SWP are counted by a counter 62, and the count value from the counter 62 is compared with a predetermined number n by a comparator 63.

Therefore, when a period in which the outputs from the registers 51 and 52 do not coincide with each other continuously appear n times, a coincidence signal is output from the comparator 63 as the timing shift signal TMC described above.

According to this embodiment, when the no-tracking method is employed, track address signals such as frame addresses are used, and block address signals such as block addresses are also effectively utilized. Therefore, even if the rotary heads cross a plurality of tracks during a single scanning operation, reproduced track address signals to be compared with reference track address signals such as reference frame addresses can be reliably extracted from the waveforms reproduced from the heads.

Even if drop-out of a signal occurs at a portion of the recording tracks, the generation point of the timing signal is shifted, so that the reproduced track address signals can be extracted. The extracted reproduced track address signals and the reference track address signals are compared with each other so as to control travel of a recording medium in accordance with the comparison result.

A case will be described wherein PCM data is written in a buffer RAM in the above-mentioned no-tracking method.

In order to write PCM data in the buffer RAM 31, a write address signal is necessary. In this case, the address signal is generated by utilizing a frame address and block address in a PCM-ID period.

However, in the data format of the tape recorder of the R-DAT type, the frame addresses are recorded in only EVEN blocks, and are not recorded in ODD blocks. THerefore, the above address signal cannot be generated for the ODD blocks.

In order to solve this problem, an address signal for the ODD block may be generated by utilizing the frame address of the EVEN block immediately before the ODD block for which the address signal is to be generated. With this method, however, if the head A crosses a plurality of tracks, e.g., tracks $2A_1$, $2B_1$ and $2A_2$ during a single scanning operation as indicated by an arrow in FIG. 14, a noise component appears when the track $2B_1$ is scanned. Therefore, the address signal of the ODD block of the track $2A_2$ is undesirably generated based on the frame addresses of the EVEN block of the track $2A_1$. In this case, data in the ODD block is written at a wrong address of the buffer RAM 31, and data previously written in the buffer RAM 31 may be broken.

Figure 15:
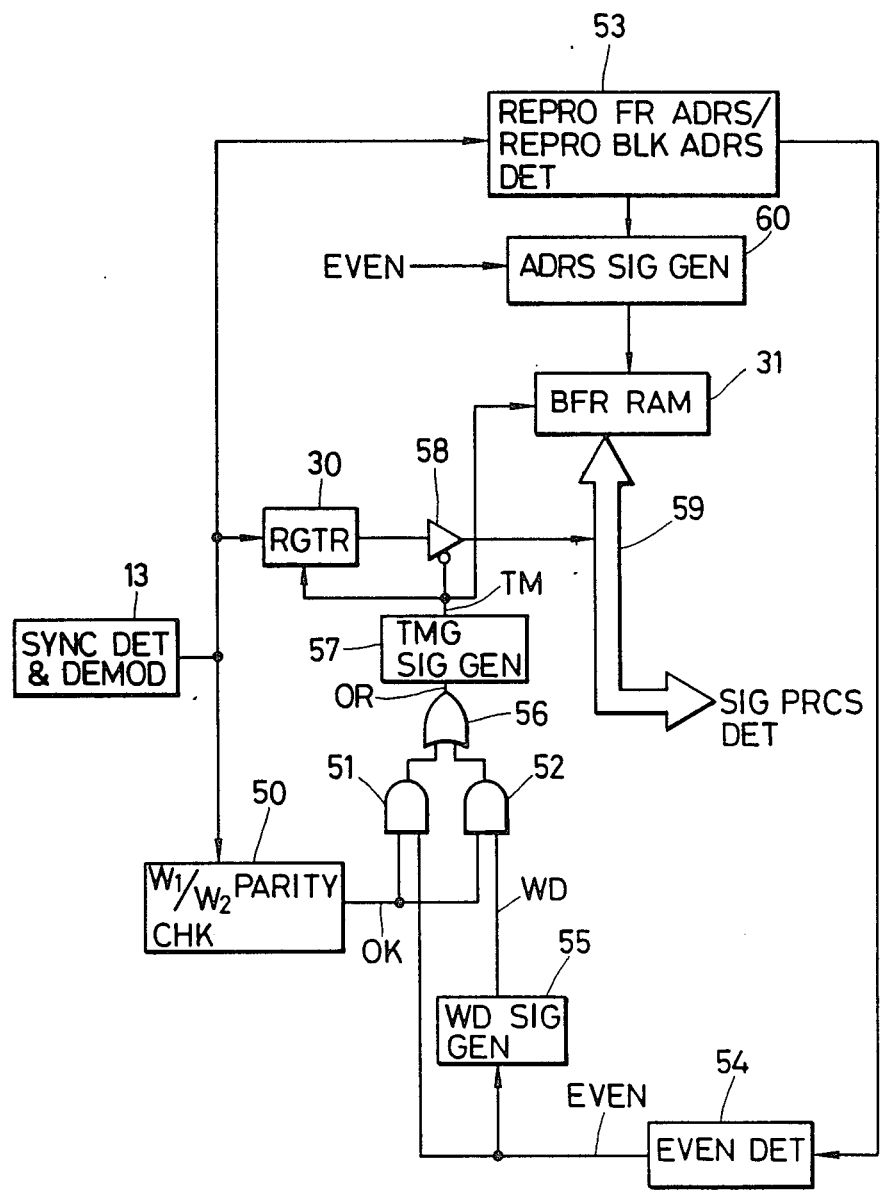
FIG. 15 is a block diagram of a circuit for writing a reproduced digital signal into a memory.

FIG. 15 shows a write circuit of a PCM signal into a buffer RAM 31 in the DAT employing the no-tracking method, and portions corresponding to those in FIG. 4 are denoted by the same reference numerals and a detailed description thereof will be omitted. FIGS. 16A to 16F show operation timings for operation of the apparatus of FIG. 15.

In FIG. 15, a reproduced signal from an EVEN block is supplied from the demodulator 13 to the $W_1/W_2$ parity check circuit 50, CRC (parity) check satisfying $P=W_1+W_2$ for $W_1$ and $W_2$ of the data in the EVEN block is performed. When a correct parity check result is obtained, a first signal OK is generated. The signal OK is supplied to first and second AND gates 51 and 52.

The reproduced signal is supplied to a data write register 30, and is also supplied to reproduced frame address and reproduced block address detector 53. The reproduced block address detected by the detector 53 is supplied to an EVEN block detector 54. Only when the reproduced signal is associated with the even block, the detector 54 supplied an EVEN signal to the first AND gate 51 and a window signal generator 55. The window signal generator 55 generates a window signal WD which goes to "H" level for a predetermined period of time substantially at the time of one block later, based on the EVEN signal, and the signal WD is supplied to the second AND gate 52.

The first AND gate 51 is enabled upon reception of the first signal OK and the EVEN signal. The second AND gate 52 is enabled upon reception of a second signal OK (to be described later) and the signal WD. The output from the first or second AND gate 51 or 52 is sent to a timing signal generator 57 through an OR gate 56. The timing signal generator 57 thus generates a timing signal TM. The signal TM is supplied to the register 30 and to the buffer RAM 31 as a write signal for restoring an interleaved state of the reproduced data, and is also supplied to a gate 58 as a gate pulse.

Therefore, when the first signal OK and the EVEN signal are obtained, the register 30 fetches data in the EVEN block from the demodulator 13, and supplies the fetched data to the buffer RAM 31 through the gate 58 and the data bus 59.

The reproduced frame address and reproduced block address detector 53 detects the reproduced frame address and the reproduced block address from the reproduced signal of the EVEN block from the demodulator 13, and an address signal generator 60 thus generates an address signal for writing data in the buffer RAM 31 based on the detected addresses. Therefore, the buffer RAM 31 can fetch data in the EVEN block based on the address signal.

When the reproduced signal from the ODD block is generated immediately after the reproduced signal is generated from the above-mentioned EVEN block, a second signal OK is output from the $W_1/W_2$ parity check circuit 50. In this case, no output is generated from the EVEN block detector 54. Therefore, the first AND gate 51 is kept off even if it receives the second signal OK.

When the second AND gate 52 receives the second signal OK, it also receives the signal WD generated from the window signal generator 55. Therefore, the second AND gate 52 is enabled. The output from the AND gate 52 is supplied to the timing signal generator 57 through the OR gate 56. Data in the ODD block is supplied to the buffer RAM 31 through the register 30, the gate 58 and the data bus 59 on the signal TM from the timing signal generator 57. At the same time, the address signal generator 60 generates an address signal based on the reproduced block address of the ODD block detected by the reproduced frame address and reproduced block address detector 53, and the previously detected reproduced frame address of the EVEN block, and the data in the ODD block is written in the buffer RAM 31 based on the address signal. The address signal generator 60 holds the frame addresses of the preceding EVEN block by the EVEN signal.

Figure 14:
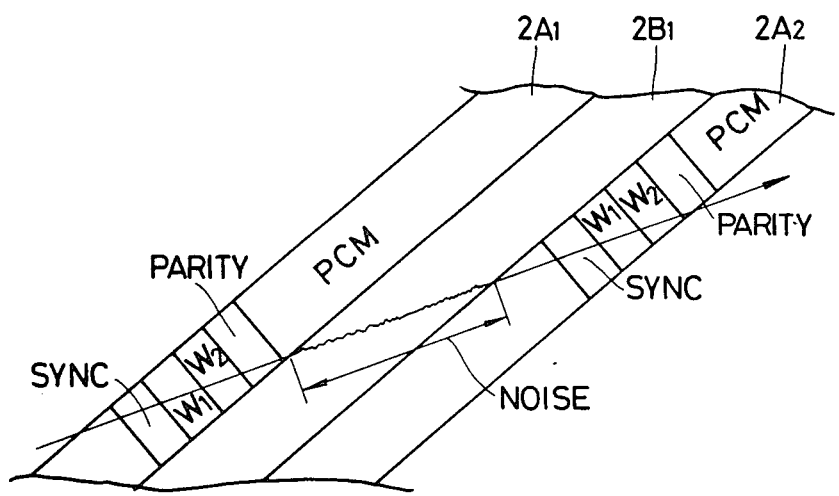
FIG. 14 shows other scanning paths of the rotary heads.

As described above, the data in the ODD block with which no frame address is recorded is written in the buffer RAM 31 based on the address signal generated by utilizing the frame address of the EVEN block previously output from the demodulator 13. The EVEN block whose frame address is utilized is only an EVEN block arranged immediately before the ODD block serving as an object on the tracks 2A and 2B. For example, if a tracking error shown in FIG. 14, occurs, no address signal is generated. Thus, data in the ODD block can be prevented from being erroneously written at a wrong address on the buffer RAM 31. In FIG. 14, a noise component appears while the head A crosses the track $2B_1$. As a result of parity check, no signal OK is generated. Therefore, when the head A scans the EVEN block of the track $2A_1$, even if the signal WD is generated from the window signal generator 55, the second AND gate 52 is kept off, and hence, data in the ODD block of the track $2A_2$ can be prevented from being written at a wrong address on the buffer RAM 31.

The data written in the RAM 31 are read out at appropriate timings, and are supplied to a signal processing circuit connected to the output of the RAM 31 through the data bus 59.

Even if there is a second signal block in which no track address signal necessary for generating an address signal for the buffer RAM 31 is recorded, an address signal for causing a memory means to fetch a reproduced signal from the second signal block can be generated by utilizng a track address signal of the first signal block.

The track address signal used for generating the address signal is only a track address signal of the first signal block arranged immediately before the second signal block of the recording track. For example, when a tracking error of the recording/reproducing head occurs, it can be effectively prevented that an erroneous address signal is generated by utilizing a track address signal of a first signal block recorded on another recording track, and the reproduced signal of the second signal block is stored at a wrong address of the memory means.

Figure 17A:
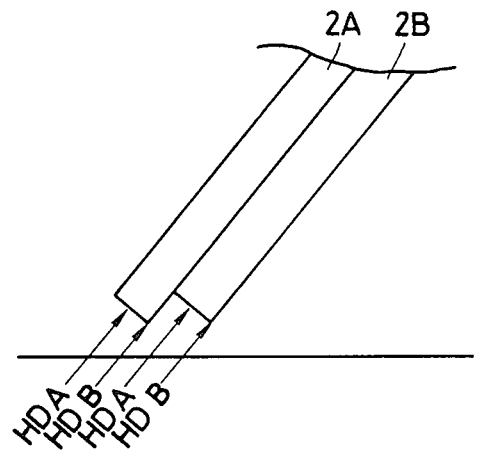
FIGS. 17A and 17B show still other scanning paths of the rotary heads A and B.
Figure 17B:
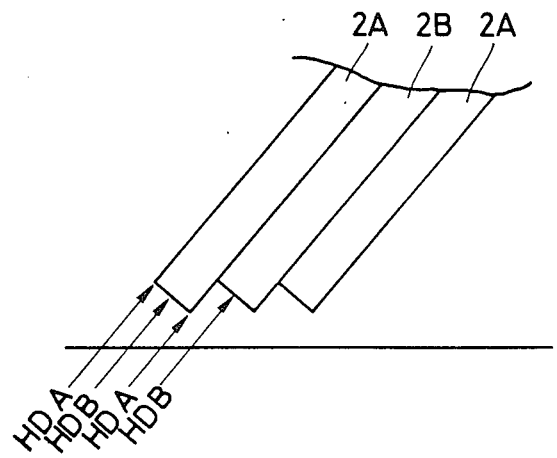

In the above-mentioned no-tracking method, the heads A and B are rotated at a speed at least twice that of the recording mode. Therefore, an identical head may scan an identical track twice or more, and may read identical data twice or more. Assume a substantially just tracking state as shown in FIG. 17A or 17B, when the rotational speed of the heads A and B is twice that in the recording mode. In the case of FIG. 17A, the head A scans the track 2a once but the head B scans the identical track 2B twice. In the case of FIG. 17B, the head A scans the identical track 2A twice and the head B scans the track 2B once.

The data read by the heads A and B are written in the buffer RAM 31. The write addresses for the RAM 31 are generated based on the frame and block addresses shown in FIGS. 2 and 3. Assume that after the first scanning is satisfactorily performed and data including almost no error are written in the RAM 31, the second scanning is performed in a state worse than that of the first scanning, so that data including many errors are obtained. The data including many errors are written at the same addresses as those at which the data obtained by the first scanning are written. The data including almost no error and obtained by the first scanning are broken by those obtained by the second scanning.

In the no-tracking method, the heads A and B are rotated at a speed twice or more than in the recording mode, so that the data can be read twice or more. Therefore, highly precise data must be selected and written in a memory.

Figure 18A:
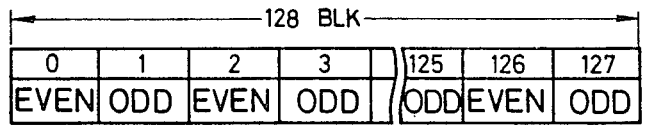
FIGS. 18A to 18D are timing charts for illustrating when a reproduced digital signal is written into a memory.
Figure 18B:
Figure 18C:
Figure 18D:
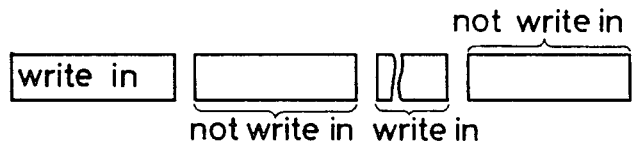

FIGS. 18A and 18D are timing charts illustrating when reproduced PCM data is written in a buffer RAM 31 in a digital audio tape recorder employing the no-tracking method shown in FIG. 4, and show a case wherein the scanning shown in FIG. 17A or 17B is performed and identical data can be obtained twice from the same head.

When the head (A or B) first scans the track (2A or 2B), error detection is performed using a $C_1$ code for the 0th to 127th blocks. In this case, all the reproduced data from the blocks are written in the buffer RAM 31, and meanwhile, a syndrome is calculated for each pair of EVEN and ODD blocks. If no error is found, a flag is set at an address corresponding to that of the RAM 31 at which the data of a block including no error is written. In FIG. 18C, for example, a flag is set for the pair of second and third blocks, and a flag is also set for the pair of 126th and 127th blocks.

Data obtained by the second scanning are then written in the RAM 31. Prior to the data write access, it is checked if a flag is set at a flag address corresponding to that at which the data is to be written. Only when no flag is set, the data is written, to update the data at that address. When the flag is set, since the second data is not written, data including no error written in the first scanning can be held at that address.

Figure 19:
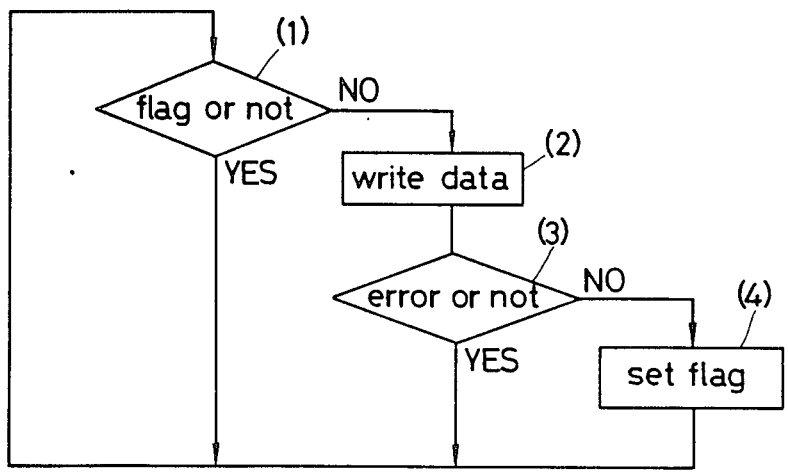
FIG. 19 is a flow chart for illustrating when the reproduced digital signal is written into the memory.

In practice, each time the heads A and B scan tracks, the presence/absence of a flag at an address corresponding to a data block is checked. Only when no flag is set, the data is written at that address, and error detection is performed. If no error is detected, the flag is set. More specifically, as shown in FIG. 19, the presence/absence of a flag corresponding to a write address of data to be written is checked in step (1). If NO in step (1), the flow advances to step (2), and the data is written at that address. Meanwhile, in step (3), a syndrome is calculated to check the presence/absence of an error. If YES in step (3), the flow returns to step (1). If NO in step (3), a flag is set in step (4), and thereafter the flow returns to step (1).

Upon repetition of the above operation, even if an identical head scans an identical track twice and data is written twice at an identical address, data including no error can be reliably retained.

In FIGS. 18 and 19, in practice, CRC parity check of $P = W_1 + W_2$ is performed before flag detection and data write access. Only when no error is detected by the parity check, the above-mentioned operation is performed. When a predetermined volume of data is written in the RAM 31 and is processed and the processed data is output, the flag is also reset.

Figure 20:
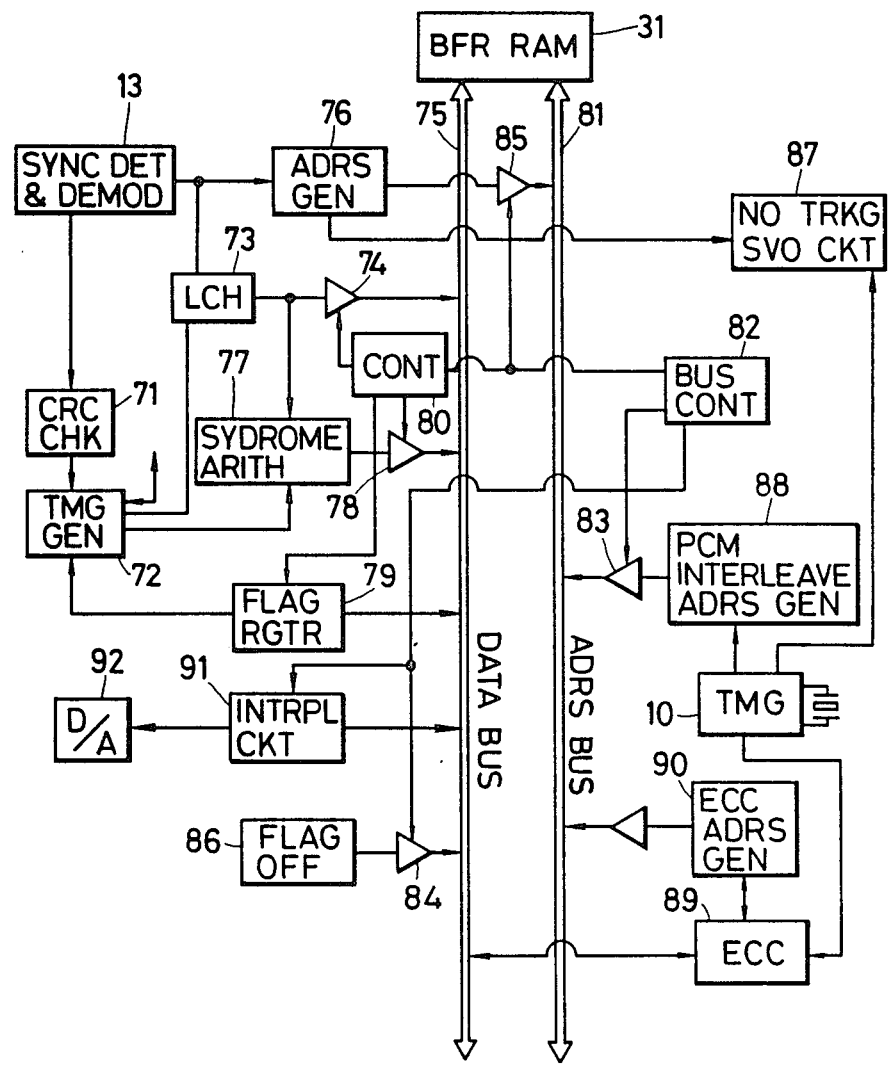
FIG. 20 is a block diagram showing another embodiment of a circuit for writing the reproduced digital signal into the memory.

FIG. 20 shows an embodiment for carrying out the above-mentioned principle.

Part of input data obtained from the sync detector and demodulator 13 is always input to a CRC check circuit 71 to be subjected to parity check of $P = W_1 + W_2$. As a result of parity check, if no error is found, a signal OK is output to a timing generator 72, which generates a predetermined timing signal such as a latch pulse based on the signal OK and sends it to a predetermined circuit. A latch 73 fetches data of EVEN and ODD blocks from the sync detector and demodulator 13 based on the latch pulse. The data is written in the buffer RAM 31 through a gate 74 and a data bus 75. In this case, a write address is generated in an address generator 76 based on frame and block addresses of the input data, and the generated address is supplied to the RAM 31 through a gate 85 and an address bus 81. During the write access, the data is also supplied to a syndrome arithmetic circuit 77, and is subjected to error detection using a $C_1$ code. If no error is found, a flag F is written, through the gate 78 and the data bus 75 at a flag address corresponding to the address on the RAM 31 at which the data is written.

A flag register 79 reads out the flag at the corresponding flag address of the RAM 31 prior to the write access. If no flag is detected, the flag register 79 sends a signal to the timing generator 72. Based on this signal, the timing generator 72 generates a write pulse for the RAM 31. A bus controller 82 sends a predetermined control signal to the gates 74 and 78 through a controller 80 based on the timing signal, and controls other gates 83, 84, and 85 at predetermined timings. A flag OFF circuit 86 resets all the flags in the RAM 31 in an initial state.

A no-tracking servo circuit 87 has the circuit arrangement shown in FIG. 4, and receives a pulse from the timing generator 10.

A PCM interleave address generator 88 generates an interleave address for de-interleave processing of data written in the RAM 31 based on the signal from the timing generator 10, and supplies the address to the RAM 31 through an address bus 81. An ECC circuit 89 performs error correction processing of data written in the RAM 31 based on an address generated by an ECC address generator 90.

The data stored in the RAM 31 and subjected to predetermined signal processing described above is read out at a predetermined timing and is sent to an interpolation circuit 91. The data is subjected to predetermined interpolation such as previous-value interpolation, and is then supplied to a D/A converter 92 to be converted to an analog audio signal. When data is read out from the RAM 31, all the flags of the RAM 31 are reset, based on the signal from the flag OFF circuit 86.

FIG. 21 shows a detailed circuit arrangement of the syndrome arithmetic circuit 77, the timing generator 72, and the bus controller 82.

The syndrome arithmetic circuit 77 comprises a series-1 syndrome arithmetic circuit $77_1$ for performing calculation for odd-numbered symbols and a series-2 syndrome arithmetic circuit $77_2$ for performing calculation for even-numbered symbols for data constituted by 72 symbols per block, as shown in FIG. 21. These circuits $77_1$ and $77_2$ are operated based on the signal OK depending on the parity check.

The timing generator 72 generates timing signals for managing data for two blocks, i.e., EVEN and ODD blocks, based on the signal OK. The timing signals include a flag read signal FR, a flag write signal FW, and identification signal ID for the series-1 and series-2 syndrome arithmetic circuits $77_1$ and $77_2$, a flag read request signal FRQ, a flag write request signal FWQ, a series-1 syndrom calculation request signal $Q_1$, a series-2 syndrom calculation request signal $Q_2$, and the like. These timing signals are sent to the syndrome arithmetic circuits $77_1$ and $77_2$ and to a bus controller 82 through predetermined gate circuits such as OR gates, AND gates and the like. Series-1 and series-2 flags $F_1$ and $F_2$ obtained from the syndrome arithmetic circuits $77_1$ and $77_2$ are finally written in the RAM 31 through gates 93 and 94 and the data bus 75, and area also sent to the bus controller 82 through registers 95 and 96, AND gates 97 and 98, an OR gate 99 and an AND gate 100. Based on these flags, the bus controller 82 outputs a read/write signal R/W for the RAM 31.

It will be apparent that various modifications and/or additions may be made in the apparatus of the invention without departing from the essential feature of novelty involved, which are intended to be defined and secured by the appended claims.

What is claimed is:

1. A digital signal reproducing apparatus for a recording medium on which a plurality of signal blocks are recorded on a plurality of recording tracks and reproduced using a rotary head, said rotary head being rotated at a speed which allows said head to scan each recorded track at least twice, comprising:
    error detection means for performing error detection of a reproduced signal for each signal block;
    memory means for storing a detection signal from said error detection means and the reproduced signal from the signal block corresponding to the detection signal; and
    means for checking the content of said detection signal in said memory means, and when the detection signal represents no error, preventing the reproduced signal of the same signal block corresponding to the detection signal from being again written in said memory means.

2. An apparatus according to claim 1, wherein said error detection means includes means for calculating a syndrome for each pair of EVEN and ODD blocks.

3. An apparatus according to claim 1, including first signal blocks records with a track address signal and a block address signal at predetermined positions, and second signal blocks recorded with a block address signal at a predetermined position, said blocks being alternately arranged on the recording track of said recording medium, and
    said apparatus further comprises:
    a memory for storing the reproduced signal;
    error check means for checking an error of each signal block;
    detection means for detecting that the reproduced signal is generated from said first signal block;
    window signal generating means responsive to said detection means for outputting a window signal corresponding to the time during which the second signal block following immediately after the first signal block on the recording track is reproduced;
    timing signal generating means for generating a timing signal when said window signal is generated and said error check means generates a signal indicating that no error is detected; and
    address signal generating means for generating an address signal for causing the reproduced signal from the second signal block to be stored in said memory means based on the block address signal of the second signal block and the trace address signal of the first signal block when said timing signal is detected.

4. An apparatus according to claim 3, wherein said error check means includes a parity check circuit for checking the parity of each signal block.

5. An apparatus according to claim 1, further comprising:
    extraction means for extracting a track address signal and a block address signal included in the reproduced signal obtained from said rotary head;
    pulse signal generating means for generating a pulse signal having a predetermined time interval at a predetermined timing based on the block address signal;
    detection means for detecting the track address signal included in the predetermined time interval from the track address signal based on the pulse signal;
    comparison means for comparing the detected track address signal and a reference track address signal; and
    control means for controlling travel of said recording medium in accordance with said comparison means.

6. An apparatus according to claim 5, wherein said pulse signal generating means comprises means for shifting the type of generating timing of the timing signal when the track address signal included in the predetermined time interval is not detected within a predetermined number of times or for said predetermined time interval.

7. An apparatus according to claim 5, wherein said rotary head comprises a plurality of heads, and
    said apparatus further comprises head selection means for detecting a track address signal reproduced by only one head and when no track address signal reproduced by said one head is detected, for switching to a track address signal reproduced by another of said heads.

* * * * *